United States Patent
Gruber

[15] 3,665,556
[45] May 30, 1972

[54] SHRIMP DEHEADING MACHINE

[72] Inventor: William J. Gruber, Box 904, Grand Isle, La. 70350

[22] Filed: Dec. 11, 1970

[21] Appl. No.: 97,068

[52] U.S. Cl. ..................................... 17/71, 17/48
[51] Int. Cl. ........................................... A22c 29/00
[58] Field of Search ............................ 17/71, 73, 48, 45, 51

[56] References Cited

UNITED STATES PATENTS

| | | | |
|---|---|---|---|
| 2,888,709 | 6/1959 | Lapeyre | 17/71 |
| 2,958,896 | 11/1960 | Merrick | 17/71 |
| 3,309,731 | 3/1967 | Stephenson | 17/51 |

FOREIGN PATENTS OR APPLICATIONS

| | | | |
|---|---|---|---|
| 1,179,303 | 1/1970 | Great Britain | 17/71 |

*Primary Examiner*—Lucie H. Laudenslager
*Attorney*—Berman, Davidson & Berman

[57] ABSTRACT

A shrimp deheading apparatus consisting of an arcuate rockable inclined trough having upstanding pins and a rocker bar carrying depending prongs which extend between the upstanding pins. The bar rocks coaxially with the trough and both are rocked simultaneously in opposite directions by a common motor. Water jets are applied to the interior of the trough. The spacing between the upstanding pins and the depending prongs is such that shrimp delivered into the trough are engaged simultaneously by the pins and prongs and are thereby bent in a manner to break the heads of the shrimp away from their edible body portions. The lower end of the trough is open to allow the deheaded shrimp to be washed into a receiving container.

12 Claims, 11 Drawing Figures

INVENTOR.
WILLIAM J. GRUBER,
BY
Berman, Davidson & Berman,
ATTORNEYS.

INVENTOR.
WILLIAM J. GRUBER,
BY
Berman, Davidson & Berman,
ATTORNEYS.

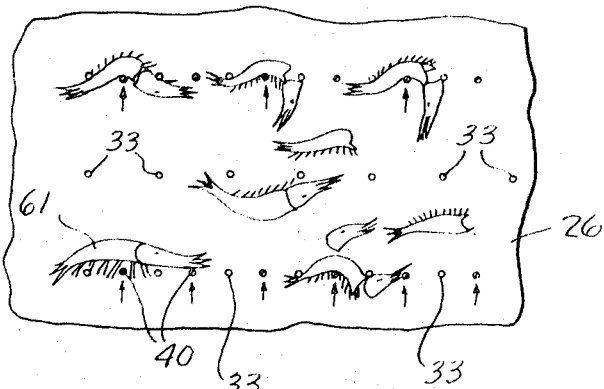
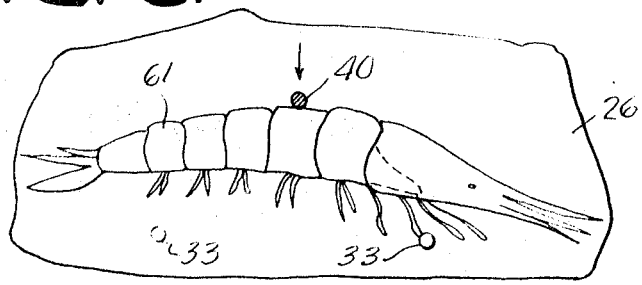
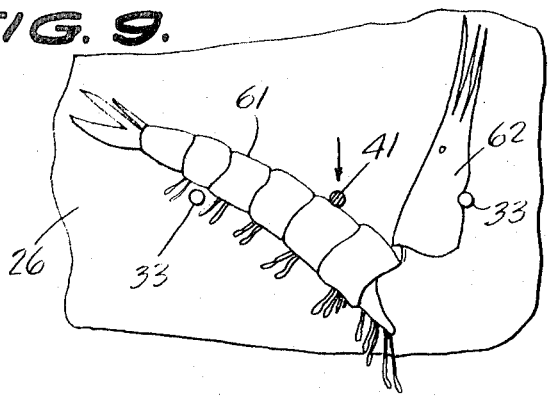
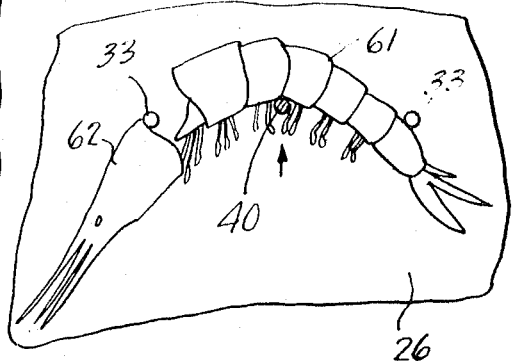
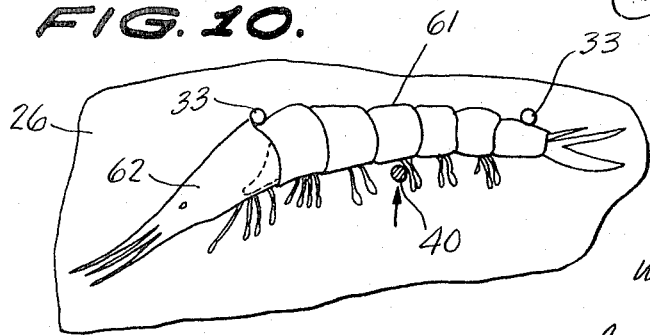

SHRIMP DEHEADING MACHINE

This invention relates to seafood processing apparatus, and more particularly to a machine for separating the heads from the edible body portions of shrimp in preparing the shrimp for the commercial market.

The main object of the invention is to provide novel and improved shrimp deheading apparatus which is relatively simple in construction, which is efficient in operation, which has a high capacity and which requires a minimum amount of maintenance.

A further object of the invention is to provide improved shrimp deheading apparatus which is inexpensive to manufacture, which is relatively compact in size, which is easy to keep clean and which has relatively few moving parts.

A still further object of the invention is to provide an improved shrimp deheading apparatus in which shrimp are deheaded without the necessity of handling them and without the use of human labor and which operates on the principle of bending the shrimp in a manner to cause the heads of the shrimp to break away from the edible body portions thereof and to cause minimal damage to the edible body portions.

As is well known to those familiar with the preparation of seafood articles for the market, it is desirable to remove the heads from the shrimp before preparing them or packing them for the commercial market. Thus, if shrimp are to be stored for any length of time in a frozen state, the heads must be removed in order to eliminate the mushy organs and fat that lodges in the rear portions of the heads. Shrimp which are frozen headless, with a water glaze, remain in perfect condition for over a year. Shrimp that are frozen with their heads attached become discolored in a short time and are unfit for the market.

In processing shrimp for the commercial market, it has been heretofore customary to use human labor to remove the heads from shrimp, and in view of the fact that a large quantity of shrimp has been thus prepared has involved the use of an enormous amount of human labor in deheading the shrimp.

The structure of the shrimp basically consists of two parts, the head and the tail. The head, which is rigid, comprises 40 percent of the length of the shrimp, along with the tail, which is composed of solid tube-shaped meat, covered at the sides and dorsal portion with thick segments of shell that articulate, allowing the shrimp to bend inward towards its legs to define a U-shaped configuration. Five sets of lateral condyle hinges between the segments on both sides of the shrimp, allow the shrimp to bend into this U-shaped or "hairpin" configuration. Along the ventral or underside of the shrimp are folds of soft "belly shell" or articular foramina that run the length of the shell and half the distance under the head and form the basic connection that holds the head to the tail section. Thus, where the head and the tail meet is the weakest part of the structure of the shrimp. Thus, the main purpose of the present invention is to utilize the fact that this portion of the structure of the shrimp is relatively weak and that the head of the shrimp can be broken away from its tail section conveniently at this weak point, if the shrimp is forced to bend in an opposite direction than that intended by nature.

First, the main purpose of the apparatus of the present invention is to provide a structure wherein the shrimp is forced to bend in a manner such that it will break at the above-mentioned weak point, namely, the region where the head and tail join.

Another important purpose of the invention is to provide apparatus wherein shrimp move between cooperating fingers and prongs which act on the shrimp to bend them, as above described, and wherein the shrimp is maintained substantially parallel to the rows of fingers and prongs, thereby being held in proper position to be deheaded.

A still further purpose of the present invention is to provide an apparatus wherein the shrimp being processed are moved by means of jets of water, which provide a conveying and washing action which moves the shrimp toward the discharge end of the apparatus at the same time removing residue such as mushy organs and fat that may cling to the edible tail sections of the shrimp.

A still further object of the present invention is to provide an apparatus wherein the shrimp are deheaded in a clean and efficient manner and wherein the deheaded shrimp travel through the machine without being damaged.

Further objects and advantages of the invention will become apparent from the following description and claims, and from the accompanying drawings, wherein:

FIG. 7 is a cross-sectional view taken substantially on line 7—7 of FIG. 6, showing the relationship of pins and prongs of the apparatus with shrimp placed therein for processing.

FIG. 8 is an enlarged horizontal cross-sectional view showing a shrimp passing between cooperating pins and prongs of the apparatus prior to being deheaded.

FIG. 9 is a view similar to FIG. 8 showing the cooperative action of the pins and prongs in deheading the shrimp, wherein the bending of the shrimp is opposite to its normal curvature.

FIG. 10 is a view similar to FIG. 8, but showing a shrimp passing between cooperating pins and prongs with the shrimp oriented oppositely to that shown in FIG. 8, namely, so as to be bent in a direction corresponding to its normal body curvature.

FIG. 11 is a view similar to FIG. 9, showing the manner in which the head of the shrimp of FIG. 10 is detached from its body by being bent excessively in the direction of its normal curvature.

Figure 1:
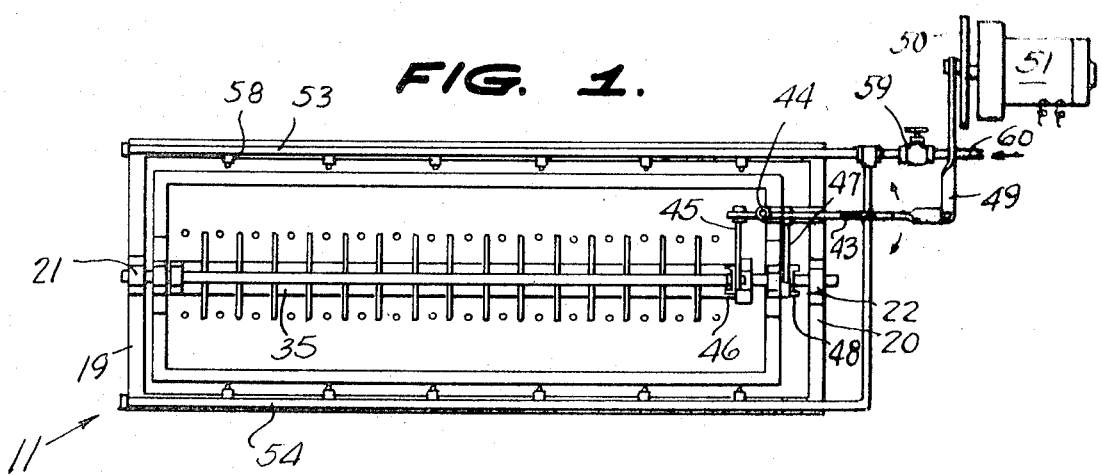
FIG. 1 is a top plan view of an improved shrimp deheading apparatus constructed in accordance with the present invention.

Referring to the drawings, 11 generally designates an improved shrimp deheading machine constructed in accordance with the present invention. The machine 11 comprises a supporting frame, designated generally at 12, consisting of a pair of spaced upstanding corner posts 13, 14 at the left end of the frame, as viewed in FIGS. 1 and 2, a pair of opposite corner posts 15, 16, longitudinal horizontal bars 17, 18 rigidly connecting the intermediate portions of respective pairs of corner posts 13, 15, and 14, 16, and transverse top cross-bars 19 and 20 rigidly connecting the top ends of the respective pairs of upstanding corner posts 13, 14 and 15, 16. The right end corner posts 15 and 16 are substantially higher than the left end corner posts 13 and 14, so that the horizontal cross-bar 20 is at a higher level than horizontal cross-bar 19.

Figure 2:
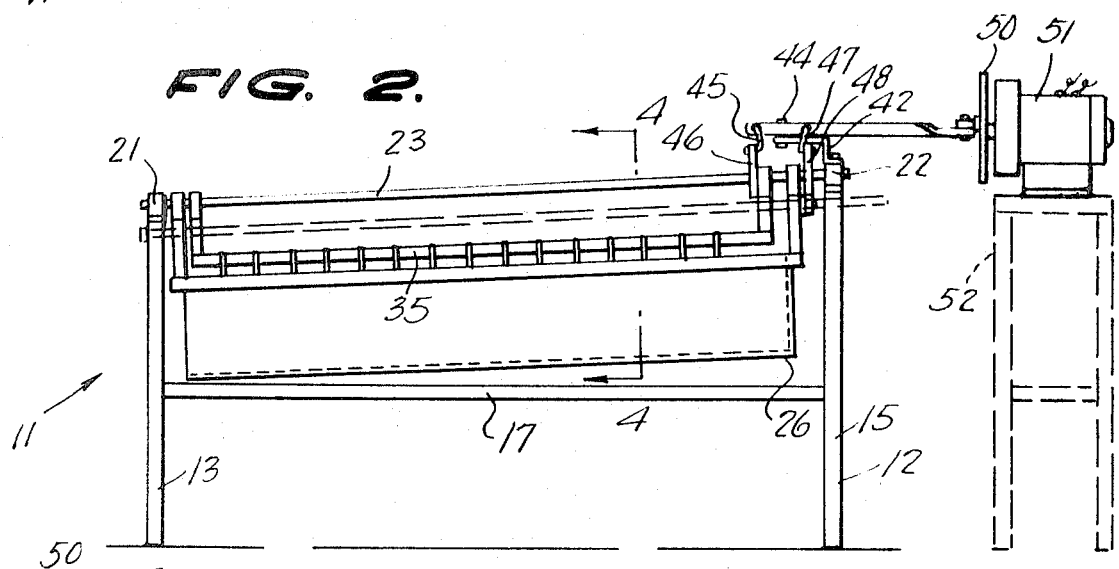
FIG. 2 is a side elevational view of the shrimp deheading apparatus of FIG. 1.

Journaled in respective bearing blocks 21 and 22, centrally secured on cross-bars 19 and 20 is a longitudinal supporting shaft member 23, which is thus inclined upwardly and rightwardly, as viewed in FIG. 2.

Figure 6:
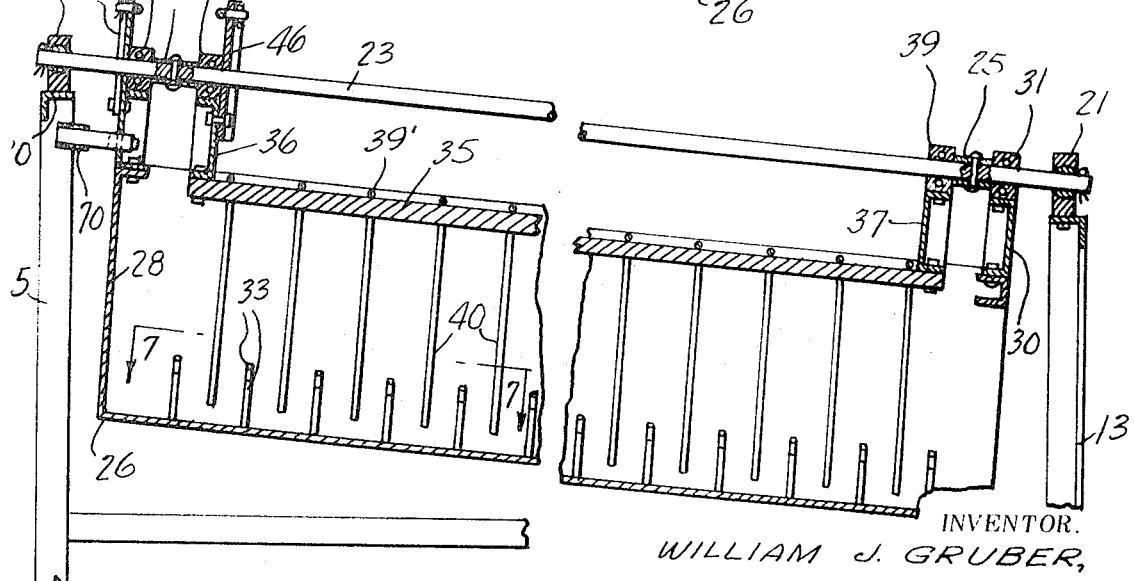
FIG. 6 is a fragmentary longitudinal cross-sectional view taken substantially on line 6—6 of FIG. 4.

Secured on the shaft 23 adjacent its opposite ends are respective stop sleeves 24 and 25, as shown in FIG. 6, and journaled on the shaft 23 is a trough member of arcuate transverse cross-sectional shape, generally designated as 26. The trough member 26 has a cross-section which subtends an arc of approximately 150°, with its axis at the shaft 23, the trough member being provided at its opposite longitudinal edges with generally channeled flanges 27, 27. Trough member 26 is provided at its upper end, namely, its left end, as viewed in FIG. 6, with the transverse end wall 28 through which shaft 23 extends, a conventional ball-bearing unit 29 being interposed between end wall 28 and the stop sleeve 24. The right end of trough member 26 is open, and a bracket bar 3 is secured transfersely to the top right corners of trough 26, as viewed in FIG. 6, the mid portions of the bracket being provided with a conventional ball-bearing unit 31 through which shaft 23 extends, the ball-bearing unit 31 being located substantially in abutment with the stop sleeve 25. Trough member 26 is thus suspended for oscillation around the axis of shaft 23.

Figure 4:
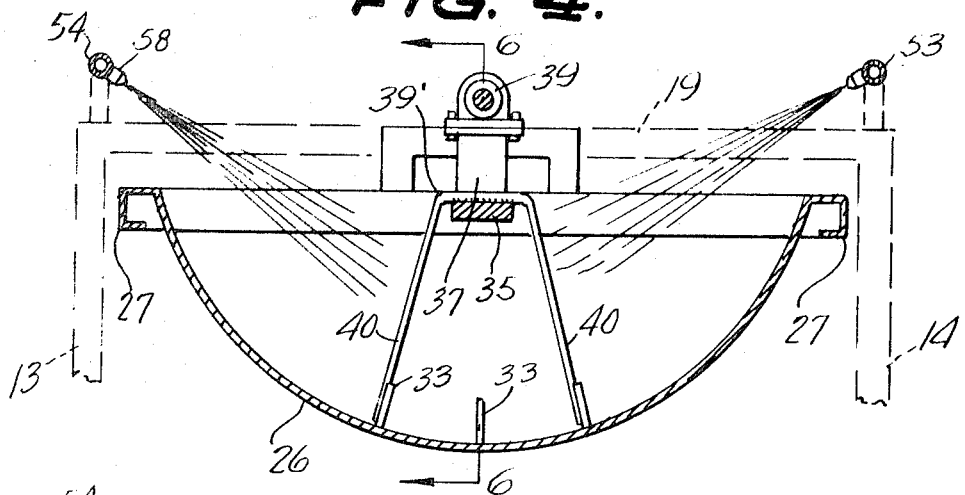
FIG. 4 is an enlarged transverse vertical cross-sectional view taken substantially on the line 4—4 of FIG. 2, with the apparatus in its normal static position.
Figure 5:
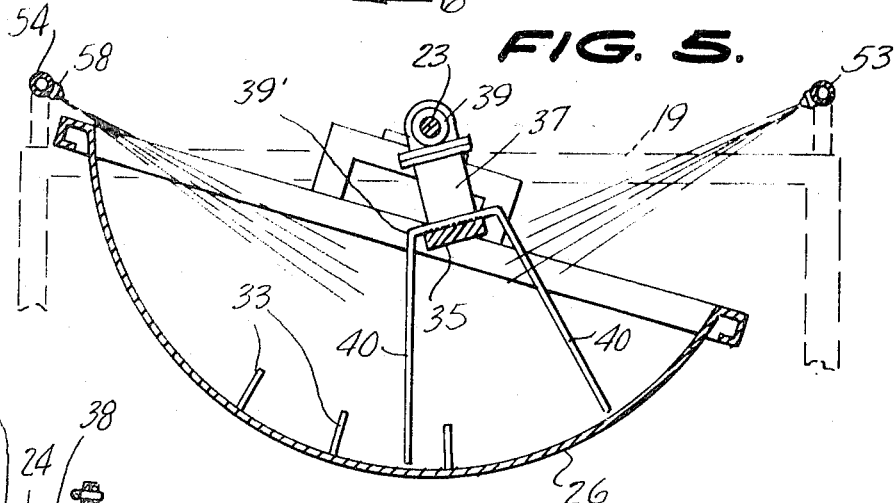
FIG. 5 is a transverse vertical cross-sectional view similar to FIG. 4, but showing the parts moved away from their normal positions, during the operation of the apparatus.

Trough 26 is provided with three rows of upstanding pins 33 running from end to end of the trough, and located in its midportion, as is clearly shown in FIGS. 4 and 5. The pins 33 are located in said three rows with the rows being approximately 4 inches apart and the pins in each row being approximately 3 inches apart. The radius of the curvature of the trough member 26 is approximately 12 inches.

The 3-inch spacing between the pins 33 of each row represents approximately two-thirds to three-fourths of the length of a shrimp of the size for which the apparatus is expected to be employed, as will be apparent from FIGS. 8 to 11. It will be apparent to those skilled in the art from the following discussion, that the spacing between the pins may be altered in accordance with the length of the shrimp to be employed with the apparatus.

Rotatably supported on the shaft 23 is a flat bar 35 which is provided at its opposite ends with respective brackets 36 and 37, said brackets extending transverse to the bar 35 and having secured on their top intermediate portions respective conventional ball-bearing units 38 and 39 which are supportingly engaged on the shaft 23 and which are substantially in abutment with the inner ends of the stop sleeves 24 and 25. Bar 35 is thus supported for oscillation around the same axis as the trough member 26. Rigidly secured on the bar 35 are a series of equally spaced inverted U-shaped rod members 39', each having a pair of downwardly divergent, substantially radially extending prongs 40, 40, the prongs 40, 40 being spaced so as to swing substantially in planes midway between the planes of transversely aligned sets of pins 33. Thus, the pairs of prongs 40 of each member 39' will be spaced longitudinally in substantially the same manner as the pins 33, namely, will be spaced apart approximately 3 inches longitudinally and are staggered relative to the transversely aligned sets of pins 33. This is clearly shown in FIG. 6. Thus, the bight portions of the members 39' are rigidly secured in any suitable manner to the bar 35, as by welding, or the like, with the prongs 40 depending therefrom, each pair of prongs being contained in a transverse radial plane, the radial planes of the respective pairs of prongs 40, 40 being located midway between the radial planes of the respective sets of transversely aligned upstanding pins 33. As shown in FIGS. 4 and 5, the prongs 40 are of sufficient length to extend closely adjacent to the upwardly concave surface of the trough member 26.

Figure 3:
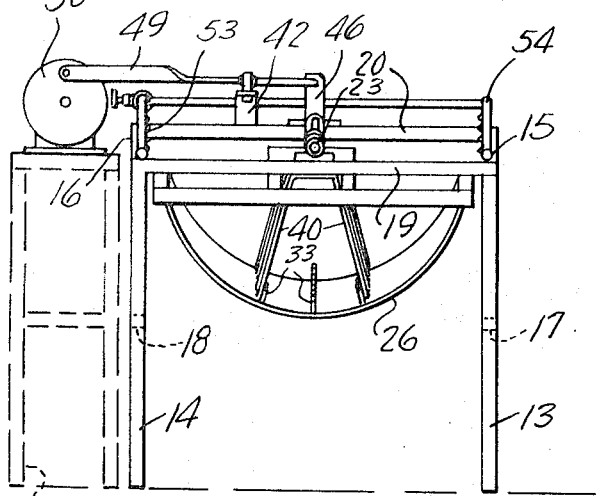
FIG. 3 is an end elevational view of the shrimp deheading apparatus of FIGS. 1 and 2.

A generally Z-shaped bracket member 42 is rigidly secured on cross-bar 20 at a location spaced laterally from shaft 23, namely, to the left, as shown in FIG. 3. Riveted to the top arm of bracket 42 at 44 is a substantially horizontal lever 43. The end of lever 43 is connected at the left side of the pivotal connection 44, as viewed in FIG. 1, by a link arm 45 to the top end of an upstanding arm 46, secured to the bracket member 36, associated with bar 35. At the right side of the pivotal connection 44, the lever 43 is connected by a link arm 47 to the top end of an arm 48 secured to and projecting upwardly from the top flange of transverse end wall 28. A drive link 49 is connected to the right end of lever 43, as shown in FIG. 1, the link 49 being pivotally connected to the crank disc 50 driven by an electric motor 51, mounted on a suitable supporting frame 52. Thus, motor 51 oscillates bar 35 and trough member 26 in opposite directions.

Respective water jet supply conduits 53 and 54 are mounted on frame 12 over the opposite longitudinal side margins of the trough member 26, said conduits being provided with jet nozzles 58 directed downwardly and inwardly toward the interior of trough member 26, as is clearly shown in FIGS. 4 and 5. The water conduits 53 and 54, are connected through a control valve 59 to water supply pipe 60. The nozzles 58 are suitably distributed along the jet supply conduits 53 and 54 and are arranged to furnish jets of water directed downwardly and inwardly to the trough 26 substantially along its entire length.

In operation, the shrimp to be deheaded are delivered to the upper end of the trough member 26 and slide along the bottom of the trough member, the arcuate curvature of the trough member causing the shrimp to become generally longitudinally oriented, as shown in FIG. 7, wherein shrimp, such as shown at 61, are supported on the upwardly concave surface of the trough member 26 and are moved along by gravity as well as by the action of the jets from nozzles 68 toward the lower end of the trough member. As the trough member 26 and bar 35 oscillate in opposite directions, the shrimp move between the oppositely moving pins 33 and prongs 40 and the heads of the shrimp are broken away from the edible body portions thereof by the action of the cooperating pins and prongs in the manner illustrated in FIGS. 8 to 11. As above mentioned, the spacing between a pair of successive upstanding pins 33, 33 may be of the order of from three-fourths to two-thirds of the length of a shrimp, so that if a shrimp moves between a pair of pins 33, 33 and a prong 40 in the manner illustrated in FIG. 8, with the shrimp oriented as shown, namely concavely curved relative to the pins 33, 33 in FIG. 8, the prong 40 engages the tail portion of the shrimp and bends the shrimp in a direction opposite to its natural curvature in the manner shown in FIG. 9, causing the head 62 of the shrimp to break away from the edible tail portion thereof. Similarly, the shrimp oriented in the manner shown in FIG. 10, namely, with its concave surface facing a prong 40, the head 62 will be broken away from the tail portion of the shrimp 61 by the excessive bending action produced as the shrimp is bent excessively in the direction of its natural curvature by the action of the prong 40 cooperating with a pair of pins 33, 33, as illustrated in FIG. 11. It will be noted that a pin 33 can engage behind the head of the shrimp adjacent its neck portion, whereby the bending action produced by the cooperating prong 40, causes the head portion to be bent excessively in the direction of natural curvature of the shrimp, causing the head portion 62 to break away from the tail due to the weakness of the neck connection thereof, as above explained.

A similar action occurs if the shrimp is caught between a pair of prongs 40, 40 and a cooperating upstanding pin 33. Thus, due to the concurrent oscillation of the prongs 40 and the pins 33 in opposite directions, the shrimp will be deheaded regardless of their orientations. It will be noted that the longitudinally convex curvature of the trough 26, combined with gravity and the action of the water jets from the nozzles orients the shrimp to substantially longitudinal positions and thus orients the shrimp properly for the deheading action above described.

In the specific embodiment above described, the outward slant of the prongs 40, 40 may be such that the prongs may be substantially radial, and in a typical embodiment, the outward slanting of the prongs is such that the ends of the prongs adjacent the surface of trough 26 are approximately 8 inches apart. The spray jets from the nozzles 58 impinge on the sides of the trough member 26 and help to move the shrimp toward the center portion of the trough member, facilitating the proper orientation of the shrimp and providing lubrication to aid the shrimp in sliding along the inclined central portion of the trough. With each oscillation of the trough, the shrimp move downwardly along the central portion of the trough member. Shrimp that have been deheaded at any point of their travel are reduced in size by almost half and will thus pass without harm through the pins and prongs below the region at which they have been deheaded.

Rubber bumpers 70 are provided on the trough member 26 which are engageable with portions of the supporting frame at the ends of the respective oscillations of the pan to provide resilient impact which causes the shrimp to be vibrated or shuffled with each contact, thus aiding in the proper orientation of the shrimp in the trough member. Thus, as shown in FIG. 6, rubber bumpers 70 may be secured to the trough member 26 adjacent its upper end corners in positions to engage the cross-bar 20 at the end of each oscillation of the trough member.

The deheaded shrimp are delivered through the opened lower end of the trough member into a suitable receiving container where they can be separated in any suitable manner from the detached heads and other undesirable debris.

The basic concept of the present invention can be embodied in other suitable structures, different from the specific embodiment above described and illustrated in the drawings. For example, the receptacle means on which the shrimp to be deheaded are deposited may comprise a moving belt with upstanding pins and the cooperating member may comprise other belt spaced above the first-names belt and provided with depending fingers corresponding to the prongs 40, the upper belt being operated to move its depending fingers in a direction transverse to the lower belt carrying the shrimp to be deheaded. Various other suitable structures may be employed embodying the basic concept of the invention.

While a specific embodiment of an improved shrimp deheading apparatus has been disclosed in the foregoing description, it will therefore be understood that various modifications within the spirit of the invention may occur to those skilled in the art. Therefore, it is intended that no limitations be placed on the invention except as defined by the scope of the appended claims.

What is claimed is:

1. A shrimp deheading apparatus comprising trough-like receptacle means to receive shrimp, upstanding projections in said receptacle means spaced to engage opposite end portions of shrimp, a member movably mounted above said receptacle means, depending prongs secured to said member and extending adjacent to the surface of said receptacle means, said prongs being staggered relative to the projections, and means to generate relative movement of the receptacle means and said member in a direction substantially transverse to said receptacle means.

2. The shrimp deheading apparatus of claim 1, and wherein said upstanding projections and depending prongs are arranged in longitudinal rows.

3. The shrimp deheading apparatus of claim 2, and wherein said receptacle means is arcuate in cross-section and said member and receptacle means are rotatable relative to each other on a longitudinal axis.

4. The shrimp deheading apparatus of claim 3, and means to spray jets of water into said receptacle means on opposite sides of the longitudinal rows of upstanding projections.

5. The shrimp deheading apparatus of claim 4, and wherein said longitudinal rows of upstanding projections are arranged substantially along the longitudinal center of the receptacle means.

6. The shrimp deheading apparatus of claim 5, and wherein said receptacle means comprises an inclined trough open at its lower end.

7. The shrimp deheading apparatus of claim 6, and wherein said member comprises a bar journaled substantially coaxially relative to said inclined trough and wherein said prongs are arranged in diverging depending pairs spaced along said bar.

8. The shrimp deheading apparatus of claim 7, and wherein said trough and bar are provided with a supporting frame and a common inclined journaled shaft mounted on said frame, and wherein said motion-generating means comprises a lever pivoted to said frame and means connecting said lever to said trough and bar on opposite sides of the pivoted point of said lever.

9. The shrimp deheading apparatus of claim 8, and wherein the pivot point of said lever is spaced laterally from said inclined journaled shaft.

10. The shrimp deheading apparatus of claim 9, and wherein said trough is substantially coaxial with and subtends an angle of approximately 150° relative to said inclined journaled shaft.

11. The shrimp deheading apparatus of claim 8, and abutting means on the trough engageable at times with a portion of said frame to vibrate the trough and shuffle the contents thereof.

12. The shrimp deheading apparatus of claim 8, and a driving motor provided with a crank element, and a drive link connecting said crank element to said lever.

* * * * *